United States Patent
Graham et al.

[15] 3,664,420
[45] May 23, 1972

[54] HYDRAULIC FRACTURING USING PETROLEUM COKE

[72] Inventors: John W. Graham; Othar M. Kiel; William M. Terry; Albert R. Sinclair, all of Houston, Tex.

[73] Assignee: Esso Production Research Company

[22] Filed: Aug. 17, 1970

[21] Appl. No.: 64,338

[52] U.S. Cl. .............................................. 166/280, 166/281
[51] Int. Cl. ........................................................ E21b 43/26
[58] Field of Search .......................... 166/280, 281, 283, 308; 252/8.55 R

[56] References Cited

UNITED STATES PATENTS

| | | | |
|---|---|---|---|
| 3,249,158 | 5/1966 | Kieschnick et al. | 166/280 X |
| 2,379,516 | 7/1945 | Garrison | 166/283 X |
| 3,149,674 | 9/1964 | Schutze et al. | 166/280 |
| 3,481,401 | 12/1969 | Graham | 166/280 |
| 2,779,735 | 1/1957 | Brown et al. | 166/283 UX |
| 2,965,172 | 12/1960 | DaRoza | 252/8.55 R X |
| 3,121,464 | 2/1964 | Huitt et al. | 166/280 |
| 3,155,159 | 11/1964 | McGuire et al. | 166/281 X |
| 3,266,573 | 8/1966 | Rixe | 166/280 |

OTHER PUBLICATIONS

Modern Plastics 1965 Encyclopedia N.Y., McGraw-Hill, 1964, pp. 567–579

Primary Examiner—Stephen J. Novosad
Attorney—James A. Reilly, John B. Davidson, Lewis H. Eatherton, James E. Gilchrist, Robert L. Graham and James E. Reed

[57] ABSTRACT

A fluid containing suspended particles of petroleum coke is injected into a fracture formed in a subterranean formation. The injection conditions are such that the coke particles are carried to the ends of the fracture where they screen out and form low permeability zones. Continued injection of a fluid produces an increase in fracture pressure increasing the dynamic width of the fracture.

11 Claims, 2 Drawing Figures

INVENTORS
John W. Graham  William M. Terry
Albert R. Sinclair  Othar M. Kiel
BY Robert L. Graham
ATTORNEY

HYDRAULIC FRACTURING USING PETROLEUM COKE

BACKGROUND OF THE INVENTION

1. Field of the Invention

This invention relates to the hydraulic fracturing of subterranean formations surrounding oil wells, gas wells, water injection wells, and similar boreholes.

2. Description of the Prior Art

Hydraulic fracturing is a technique for stimulating production in wells by altering the well flow pattern. The technique involves injecting a fracturing fluid into the formation at rates and pressures sufficient to rupture the formation. In most formations, the earth stresses are such that a vertical crack (fracture) is formed by the hydraulic fracturing treatment. Once the fracture is initiated, continued injection of the fracturing fluid causes the fracture to grow in length and width. A particulate material suspended in a carrier fluid is then placed in the fracture to maintain it in a propped condition when the fracture-inducing pressure is relieved.

In designing a hydraulic fracturing treatment, many variables enter into the fracture calculations. The variables relating to formation rock properties and reservoir fluid characteristics cannot be controlled but must be assigned values since they influence the formations' response to the treatment. These variables include elastic formation properties, rock stresses, formation permeability and porosity, and reservoir fluid viscosity and compressibility, etc. Values for these noncontrollable variables can be measured by devices and techniques well known in the art or can be estimated from available data in a particular area.

The present invention is concerned with the controllable variables and their effect on fracture geometry. Fracture geometry contemplates two dimensions: fracture width and fracture length. It should be noted that fracture height is generally fixed by the upper and lower strata which define the reservoir and therefore enters the calculations as a noncontrollable variable.

The controllable variables of primary importance relate to the fracturing fluid and are: (1) fluid viscosity, (2) fluid loss characteristic, (3) fluid injection rate, and (4) fluid volume injected.

In the past, the proper fracture geometry has been obtained by controlling one or all of the variables listed above. It is known that increases in the concentration of fluid loss additive, increases in the injection rate, and increases in the volume injected, separately or collectively, produce an increase in fracture width at about the same length-to-width ratio. Thus, in order to obtain a fracture of sufficient width to permit placement of the propping agent particles, the treatment must be designed to produce corresponding increases in fracture length consistent with the length-to-width ratio, even though the additional length may contribute little to overall stimulation. The additional quantity of fluid required to generate the longer fracture, coupled with additional fluid leak-off, adds appreciably to the cost of the treatment.

Increasing fluid viscosity increases fracture width at reduced length-to-width ratios. The dramatic effect of fluid viscosity on fracture width is partially responsible for the success of the recently developed high-viscosity oil-base fluids. However, many of these fluids are temperature sensitive and for deep, high temperature reservoirs tend to lose much of their viscosity. Thus, the benefits of the high-viscosity fluids for these high temperature reservoirs may not be fully realized.

SUMMARY OF THE INVENTION

The present invention provides an improved hydraulic fracturing method which alleviates many of the difficulties outlined above and is particularly effective when used with low to medium viscosity fracturing fluids.

The method involves injecting a fluid containing suspended particles of petroleum coke into a fracture surrounding a wellbore, displacing the coke-laden fluid in the fracture until the coke particles reach the fracture ends, and injecting a fluid containing suspended propping agent particles into the fracture. The step of displacing the coke-laden fluid can be performed by injecting a fluid with or without suspended propping agent particles.

Petroleum coke is a granular, carbonaceous residue remaining from the destructive distillation of crude petroleum. The destructive distillation process known as "coking" is used for converting heavy residual bottoms of crude oil to low boiling petroleum products, with coke being a by-product. The two coking processes in commercial use today are delayed coking and fluid coking.

In the fracturing application, the coke must be granular in form and preferably should have a particle size in the range of about 10 to about 200 mesh on the U. S. Sieve Series Scale. The particulate coke exhibits properties which makes it ideally suited for the contemplated fracturing service. It has a specific gravity in the range of 0.9 to 1.3 making it easily suspended in carrier fluids. It is a friable material so that at high closure stresses, the particles crush and disintegrate into tiny fragments. The fragments which become entrained in the produced fluids can readily flow through the interstices of the packed fracture without bridging or plugging. The produced fragments are nonabrasive and therefore should not damage subsurface or surface equipment.

As mentioned above, petroleum coke is a by-product of two coking processes currently in use. However, since the coke must be reduced to particulate form for use in hydraulic fracturing treatment of wells, it is preferred that the by-product of fluid coking be used. The by-product coke is available in granular form having a particle size in the range from about 10 to about 200 mesh on the U. S. Sieve Series Scale. Thus, the material can be used in fracturing service without further processing except for screening to eliminate clinkers or other excessively large particles.

The mechanisms involved in achieving the improved results are not clearly understood. It is believed, however, that the finely divided coke particles bridge across the fracture tips, providing a zone of low permeability through which fluids must flow in order to continue propagating the fracture. The large pressure drop through this zone, however, prevents continued fracture propagation and results in a pressure buildup within the fracture upstream of the bank. The increase in fracture pressure creates wide fractures permitting the placement of larger propping agent particles than possible using presently known methods.

DESCRIPTION OF THE PREFERRED EMBODIMENT

Figure 1:
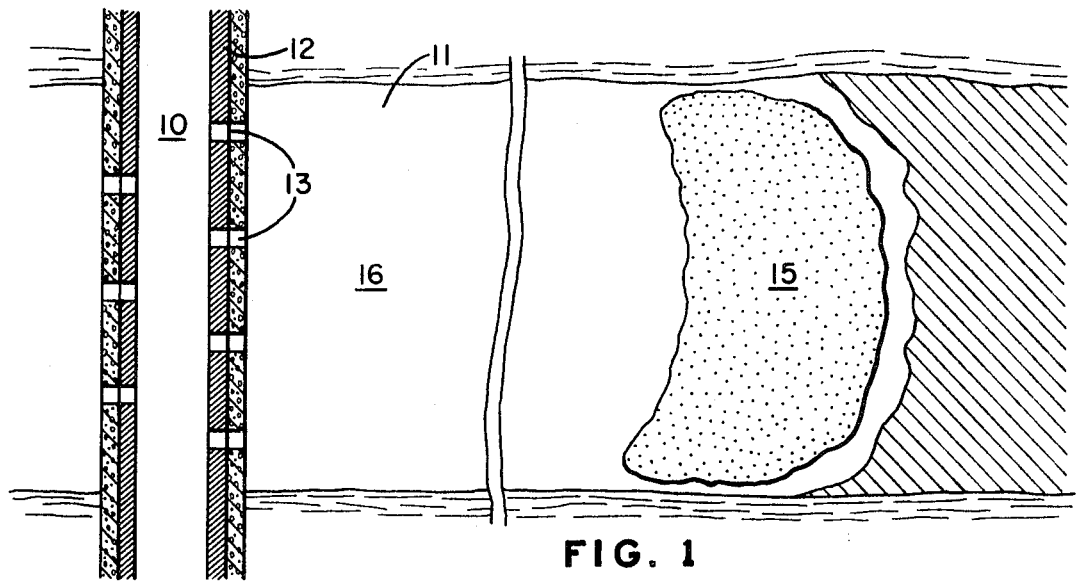
FIG. 1 depicts a vertical fracture and illustrates the deposition of the petroleum coke in a fracture in accordance with the present invention.

With reference to FIG. 1, a cased wellbore 10 is shown penetrating a subterranean formation 11. The completion as illustrated is known in the art as a perforated completion and has a casing 12 extending through the formation 11 and cemented in place. Vertically-spaced perforations 13 provide communication between the wellbore 10 and the formation 11. The drilling and the completion of the well can be done by conventional techniques well known in the art. It should be observed that the bottomhole completion can be in accordance with other schemes such as liner completion or open hole completion.

Following the completion of the well, it frequently becomes necessary to increase the productivity of the formation 11. This can be done by one of the many stimulating techniques currently used in the petroleum industry. The most common well stimulation is a technique known as hydraulic fracturing. The fracturing treatment is performed by pumping a fracturing fluid down the casing 10, through the perforations 13 and into the formation 11. The pumping rate is higher than the rate which the formation can receive. The pressure in the wellbore increases until the overburden stresses and rock tensile strengths are exceeded, causing the formation to rupture. The earth stresses are generally such that the fracture is oriented in a vertical plane extending outwardly from the wellbore 10 in diametric directions. FIG. 1 illustrates one wing of the fracture. Continued injection of fluid at high rates causes the fracture to grow in length and width. Once the fracture of the desired geometry is formed, a propping agent suspended in a carrier fluid is deposited therein to maintain the fracture in the propped condition when the injection pressure is relieved.

Figure 2:
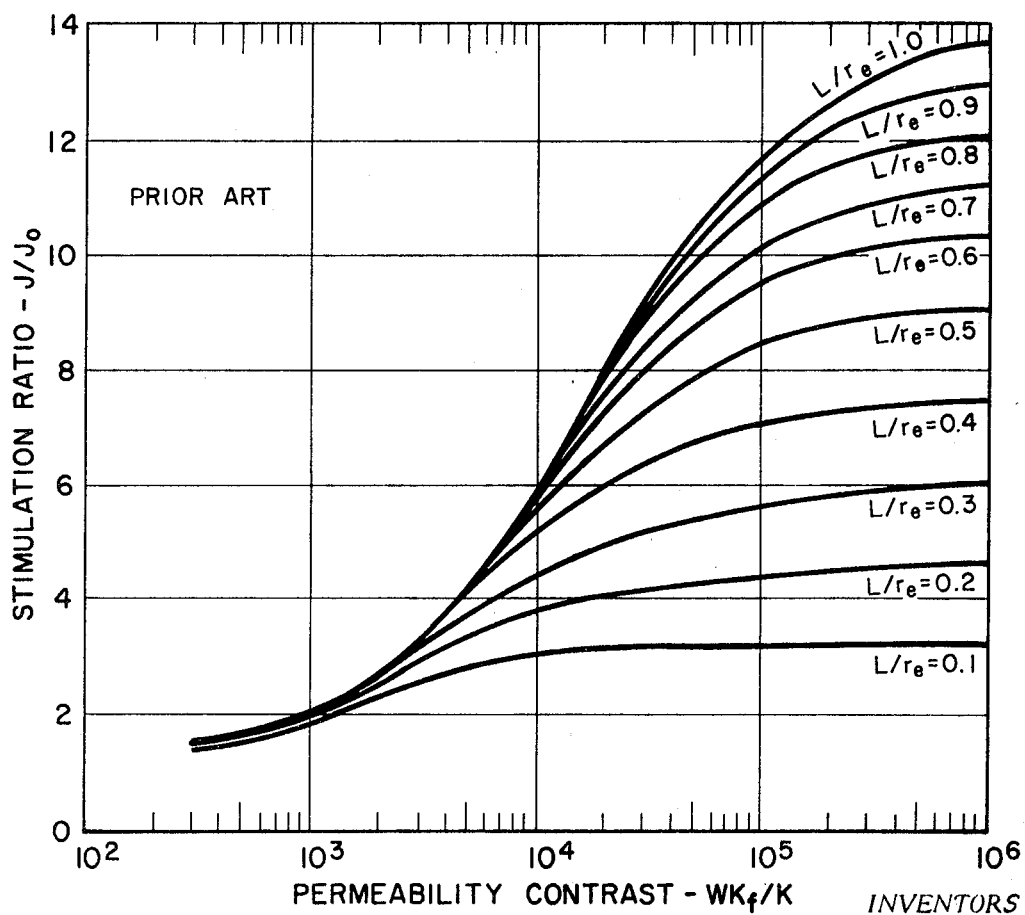
FIG. 2 is a graph showing the relationship of fracture conductivity and fracture length on stimulation.

The fracture geometry has a pronounced effect upon the degree of stimulation afforded by the fracturing treatment. FIG. 2 shows the relationship of the many factors which effect stimulation. The ordinate, denoted stimulation ratio, is the quantity $J/J_o$, where J is the productivity index after fracturing and $J_o$ is the productivity index before fracturing. Productivity index is a measure of the producing ability of a well taking into account the pressure drawdown on the reservoir. It is commonly used as the basis for evaluating the effectiveness of a stimulation treatment. The abscissa, denoted permeability contrast, is the quantity $WK_f/K$ where $WK_f$ is the propped fracture conductivity and K is the formation permeability. The conductivity ($WK_f$) is the product of fracture width (W) and the fracture permeability ($K_f$), both at propped conditions. The curves of the plot are for various ratios of fracture length (L) and reservoir drainage radii ($r_e$). Although this plot is for a 40-acre well spacing and a 3-inch wellbore radius, the general relationship holds true for other spacings. In analyzing FIG. 2, it is seen that the stimulation ratio for a particular formation is a function of the fracture dimensions (L,W) and fracture permeability ($K_f$).

In planning a fracture treatment for a reservoir of known properties, the fluid system and propping agent are selected to give the desired stimulation. For example, if a five-fold stimulation is desired in a well where FIG. 2 is applicable, the treatment should be such to provide a permeability contrast of about $9 \times 10^3$ and a $L/r_e$ ratio of at least 0.5. By assigning values to the formation properties such as permeability, porosity, rock stresses, elastic properties of the rock, and to formation fluids, the fracture geometry can be calculated. With the aid of a special computer program, the fluid properties and propping agent size and concentration can be varied until the optimum conditions are determined. The computer program can be based upon equations developed by Khristianovich and Zheltov, Barenblatt, and Howard and Fast. These and other equations are discussed in length in an article appearing in the *Journal of Petroleum Technology*, Dec. 1969, entitled "A Rapid Method of Predicting Width and Extent of Hydraulically Induced Fractures" by J. Geertsma and F. de Klerk. As reflected in FIG. 2, there is little benefit to be derived from designing the treatment to obtain a fracture having a $L/r_e$ ratio greater than about 0.5 for stimulation ratios of 5 and less. On the other hand, fracture width has a pronounced effect on stimulation where $L/r_e$ value is at least 0.5.

Thus, it is seen that for many fracturing treatments, it is desirable to provide wide fractures while maintaining the fracture length at a minimum value. Laboratory tests have shown that the dynamic fracture geometry is affected by four controllable variables: (1) fluid viscosity, (2) fluid-loss additive concentration, (3) injection rate, and (4) total treatment volume. Except for the fracturing fluid viscosity, all of these variables increase fracture length as well as fracture width. In other words, the length-to-width ratio remains about the same for variations in the values of these variables. It is known that the use of high viscosity oil base fluids (viscosities greater than about 100 centipoise) has a significant effect on fracture width with little effect on the fracture length. However, many of these oil-base fluids are temperature sensitive and lose much of their viscosity in high temperature reservoirs.

Surprisingly, it has been found that the use of a granular petroleum coke as a spearhead treatment in the fracturing operation permits the formation of wide fractures at lower treatment volumes than have been required heretofore. In performing the fracturing treatment according to the present invention, the manipulative steps comprise injecting into the subterranean formation via the wellbore, a fracturing fluid at a pressure sufficient to create a fracture in the formation, injecting into the fracture a fluid containing suspended petroleum coke particles and thereafter injecting into the formation a fluid containing propping agent particles.

Petroleum coke is a by-product of a refinery coking process used to thermally convert the heavy residual bottoms of crude oil to low boiling petroleum products. Although the petroleum coke by-product from any of the petroleum coking processes can be used, it is preferred that the by-product of the process known as fluid coking be used. This process utilizes a fluidized solids technique for the continuous conversion of the heavy crude oil. The particle sizes of the coke by-product are such that they can be used in the form at which they are discharged from the refinery. Because of its small particle size, the coke exhibits the property of flowability; hence the name fluid coke. The by-product fluid coke is available at refineries located throughout the United States and Canada. Fluid coke samples exhibited the following average properties:

| | |
|---|---|
| particle density | 1.3 grams/cubic centimeter |
| bulk density | 61.0 pounds/cubic foot |
| weight percent carbon | 90.0 |
| weight percent sulfur | 5.0 |
| weight percent ash | 0.3 |
| weight percent metal | 0.1 |
| particle size (90%) | 50–200 mesh |
| particle shape | generally spherical |

Petroleum coke, particularly fluid coke, has several unique properties which make it ideal for the use in hydraulic fracturing. Its low specific gravity of from 0.9 to 1.3 permits it to be easily suspended in most fracturing fluids. This permits it to be carried to the fracture tips without settling. The graded particle size between about 10 to 200 mesh on the U. S. Sieve Scale provides low permeability to flow when packed in the fracture tips. The low bulk density permits the formation of a long, low-permeability zone at the fracture tip. The tendency of the material to disintegrate when subjected to closure stresses produces tiny fragments which can pass through the propped interval interstices. The low abrasive quality of the material permits the fragments to be produced without danger of damage to subsurface and surface equipment.

By use of the fracturing equations with the aid of computer programs referred to above, the dynamic fracture geometry can be predicted. The width of the fracture normally must be about 2-½ times the diameter of the largest particles used. The fluid pressure within the fracture necessary to obtain the specified dynamic width can be calculated. This in turn determines the pressure drop at the end of the fracture that will be required to attain the specified width. By using a fluid free of propping agent or coke particles, the fracture length and width can be determined for a given volume treatment. After the calculated volume of fluid is injected, the fluid containing the suspended petroleum coke is injected into the fracture and is displaced through the wellbore 10 and the fracture by a fluid free of coke. The coke is carried to the fracture tips, where it bridges and packs to form a low-permeability zone 15 at each end. It should be noted that, as the fluid is carried to the outer ends of the fracture, the fracturing fluid tends to propagate the fracture further until the coke bridges and packs therein. The fluid injected behind the coke leaks through the low permeability zone 15 and into the formation 11 without further fracture propagation. The fluid injected behind the coke then increases the pressure in zone 16, which in turn causes the fracture to widen. By use of the fracturing equations the dynamic width can be calculated for various fracture pressures.

With the proper dynamic width attained the propping agent particles suspended in a fluid is deposited in the zone 16. The concentration of the propping agent particles in the carrier fluid determines the type of propping in zone 16. High concentrations provide a dense, multilayer pack; whereas low concentrations provide a sparsely spaced propping pattern known as the partial monolayer. The partial monolayer pattern is preferred over the multilayer pack because of its high fracture permeability. The wide dynamic fracture width attainable by the present invention permits the use of large propping agent particles of the type used in propping by the partial monolayer pattern.

A variety of different fracturing fluids can be utilized in carrying out the method of the invention. Suitable fluids include crude oils, petroleum fractions, thickened oils, gelled hydrocarbons, liquid polymers, water-in-oil emulsions, aqueous fluids containing thickening or gelling agents, dilatant liquids, and the like. The fluids selected for a particular fracturing operation, or for part of a particular operation, will generally depend upon the results of the design calculation discussed above. These may dictate the use of a certain fluid in some cases and in other instances may permit any of a number of different fluids. It is not always necessary that the same fluid be used for the various steps in the operation. It may be advantageous, for example, to use one fluid for initial breakdown of the formation, to employ a second fluid for carrying and displacing the petroleum coke to the ends of the fracture, and finally to employ a third fluid for depositing the proppant in the fracture.

The concentrations in which the coke particles are employed will depend somewhat upon the volume of the treatment and the dimensions of the desired dynamic geometry. Because the coke is easily suspended in the carrier fluid it can be blended into the carrier fluid at high concentrations. Field tests have shown that slurries containing from 100 to 150 pounds of coke per barrel of fluid can be successfully injected into the formation.

The propping agents utilized in carrying out the invention will normally have particle sizes greater than that feasible by use of prior art methods. Particles in the range from 6 to 8 mesh have been successfully paced in fractures by the method of the present invention. Although sand is the most common propping agent used in present fracturing operations, the invention can be performed using other proppants such as metallic shot, tempered glass beads, plastic pellets, and the like.

It is generally preferred to employ most propping agents in concentrations between 1 and about 200 pounds per gallon but this also depends upon the density of the particles selected. Excellent results have been obtained with reinforced plastic pellets in relatively low concentrations to provide a partial monolayer in the propped zone 16. If a multilayer pack is used, the total quantity of propping agent particles placed in the fracture will normally be substantially greater than the amount of petroleum coke injected earlier to form the low permeability zone 15. For the partial monolayer pack, the total quantity of propping agent particles can be less than the amount of petroleum coke used. In either type of propping, however, the length of the low-permeability zone 15 will normally be considerably less than the length of the propped zone 16 but should be at least 10 feet in order to restrict the flow of fluid therethrough. Good results have been obtained using an amount of coke which, based upon calculations, provides a 50 to 100 foot low-permeability zone 15 in 200 to 300 foot fractures.

In carrying out the invention in the field, the formation to be treated will normally first be broken down by pumping water, brine, crude oil, diesel fuel, or similar liquid into the formation at a rate sufficient to develop bottomhole pressures in excess of the formation breakdown pressure. Rates from about two to about 20 barrels per minute are generally adequate, but somewhat higher rates may sometimes be used in deep high temperature formations with high permeabilities. Filter loss control agents such as silica flour, lime, talc, guar gum, hydrocarbon resins and the like can be added to the fluid to reduce the pumping rate needed if desired. Such materials may reduce the formation permeability in the vicinity of the fracture and hence their use is generally limited to formations in which the permeability is reasonably high. The petroleum coke particles or propping agent particles are generally not used during this initial stage of the operation.

Following initial breakdown of the formation, the injection of fluid is continued until a fracture of the desired width has been propagated. This width should be sufficient to permit the entry of the petroleum coke particles which as indicated above should be about 2-½ times the particle diameter. However, because of the small size of particles, the entry of the petroleum coke should present no problems, even at the high concentrations recited above. During the placement of the petroleum coke, the fluid in advance thereof continues to propagate and lengthen the fracture. Particle settling should present no problem, particularly where a gelled water or a viscous oil is used as the suspending fluid. If the properties of the fluid are such that settling is a problem, however, the rate should be sufficiently high to transport the bulk of the coke to the fracture tips with only minimum settling. The suspended coke particles will be screened out as the fluid escapes into the formation 11. As the low permeability zone 15 grows radially inwardly towards the wellbore 10, the resistance to flow increases. This results in a gradual buildup of pressure within the zone 16.

Following the injection of the petroleum coke, fluid essentially free of suspended solids except for fluid loss control can be injected to displace the fluid-coke slurry to the fracture tips. As this fluid is injected, the pressure within the fracture will normally increase. The high pressure drop through the packed zone 15 at each end of the fracture permits the buildup of much higher pressure for given injection rate that could otherwise be obtained and hence a wider fracture than might otherwise be feasible can be secured. Once the necessary fracture width has been obtained, fluid containing suspended propping agent particles is injected into the formation to prop the fracture. The concentration of the particles in this phase of the operation will generally be increased progressively to insure that injection into the fracture takes place without screening out. If the treatment calls for a partial monolayer propping pattern, the densities of the propping agent particles and the carrier fluid are selected so that settling presents no problems. In this type of treatment, the low concentration of particles become sparsely distributed in the fracture so that, when the pressure is relieved, the fracture is propped by widely-spaced "pillars." Extremely high fracture conductivity can be obtained by use of the partial monolayer pattern. If a multilayer pack is contemplated, the relatively large fracture width permits the use of larger particles and/or of the propping at larger widths, both of which contribute to higher conductivities. In either type of operation, the well is shut-in following placement of the propping agent particles. The shut-in period generally will be in the range from about 8 to 72 hours. The well then can be placed on production. The injected fluids will be produced first and several days may be required to accomplish this, particularly if a highly viscous fluid is used.

One advantage of the method of this invention is that it permits the use of fluids of lower viscosity than might otherwise be required to obtain a fracture of the necessary width in certain formations and may thus result in relatively rapid cleanup following the fracturing operation.

The following example illustrates the effectiveness of the present invention in the stimulation of a gas well which was incapable of producing for prolonged periods. The formation, classified as a medium to soft sandstone, had the following estimated properties:

| permeability | 1.0 millidarcy |
| porosity | 20 percent |
| sonic time | 75 microseconds | gross thickness          29 feet

The job design called for the placement of the propping agent particles in accordance with the partial monolayer pattern and the selected proppant was glass reinforced nylon pellets, the subject of assignee's copending patent application entitled "Hydraulic Fracturing Using Reinforced Resin Pellets," Ser. No. 64,339, filed Aug. 17, 1970, inventor John W. Graham. In order to enhance suspendability of the pellets, a gelled water-base fluid was selected as the fracturing fluid. Preliminary studies indicated that use of this fluid would create a relatively long thin fracture resulting in only limited stimulation. The well was therefore fractured in accordance with this invention to provide a wide, relatively short fracture having considerably greater conductivity than might otherwise have been obtained. The well was completed with 5-inch casing and perforated in the intervals 10,686 – 10,690 and 10,714 – 10,725 feet. The high bottomhole temperature (275° F) dictated against the use of an oil-base fracturing fluid.

The fracturing operation was begun by first testing the system at a pressure of 9,700 psig. A pad of 500 barrels of field salt water with 420 pounds of a commercial fluid loss control additive and 3,500 pounds of potassium chloride was injected into the formation at an average rate of 10 barrels per minute to break down the formation and propagate the fracture. Conventional fracturing equipment was used. Following the injection of the pad, a gelled-water fracturing fluid was prepared and injected into the formation. This fluid contained 1,000 barrels of fresh water, 1,000 pounds of a commercial gelling agent, 1,680 pounds of a commercial fluid loss control additive, and 7,000 pounds of potassium chloride. The gelling agent used was a high molecular weight linear polysaccharide which is readily soluble in water to form a viscous non-Newtonian solution. After 750 barrels of the gelled-water fluid had been injected at an average rate of 11 barrels per minute, a slurry of the gelled-water fluid and coke particles was injected. The slurry consisted of from seven to 10 barrels of the gelled-water fluid containing 1,200 pounds of the coke. The gelled-water containing the suspended coke particles was flushed down the tubing and into the formation with about 240 barrels of the gelled-water fluid free of any suspended coke. This treatment was followed by the injection of a gelled-water fluid consisting of 238 barrels of fresh water, 238 pounds of the gelling agent, 95 pounds of a cross-linking agent for the gelling agent, 400 pounds of a commercial fluid loss control additive, 1,660 pounds of potassium chloride, and 900 pounds of glass-reinforced nylon pellets. The pellets were about 10/12 mesh in size on the U.S. Sieve Scale and the concentration was varied from 3 pounds per barrel to 9 pounds per barrel. It should be noted that this low concentration provided for propping by the partial monolayer pattern described earlier. After the fluid containing the propping agent particles was flushed into the formation, the well was shut-in for several hours. The stabilized production rate following the stimulation treatment was 590,000 standard cubic feet per day and 85 barrels of condensate per day through a 3/16-inch choke.

Although there are several factors which contributed to the large stimulation achieved, it is believed that the increased fracture width resulting from the use of the petroleum coke according to the present invention permitted the placement of large propping agent particles which provided for high fracture conductivities.

What is claimed is:

1. A method for the hydraulic fracturing of a subterranean formation surrounding a well which comprises injecting a fluid containing suspended particles of petroleum coke into a fracture in said formation, a major portion of said particles of petroleum coke being between 50 and 200 mesh in size; and thereafter injecting a fluid containing suspended propping agent particles substantially larger than said particles of petroleum coke into said fracture.

2. The invention as recited in claim 1 wherein said petroleum coke is fluid coke.

3. A method as recited in claim 1 wherein the concentration of said propping agent particles is from about 1 to about 20 pounds per gallon of the second recited fluid.

4. A method as defined by claim 1 wherein the concentration of the particles of petroleum coke is greater than 100 pounds per barrel of said the first recited fluid.

5. A method as defined by claim 1 wherein the volume of said suspended particles of petroleum coke injected into the fracture is sufficient to form beds having a length measured from the fracture end towards the wellbore of at least 10 feet.

6. A method for the hydraulic fracturing of a subterranean formation surrounding a well which comprises injecting a fluid containing suspended particles of petroleum coke into a fracture in said formation, a major portion of said particles being between 50 and 200 mesh in size, displacing the fluid containing said suspended particles in said formation until said particles reach the ends of the fracture, injecting a fluid containing suspended propping agent particles substantially larger than said particles of petroleum coke into said fracture, and thereafter closing in the well to permit the formation to close on said propping agent particles.

7. A method as defined by claim 6 wherein the step of displacing the fluid containing the suspended particles of petroleum coke is performed by injecting a fluid substantially free of suspended solids into the fracture.

8. A method as defined by claim 6 wherein the composition of said fluid containing said suspended particles of petroleum coke and the composition of the fluid for displacing said fluid containing said particles of petroleum coke are substantially the same.

9. A method for the hydraulic fracturing of a subterranean formation surrounding a well which comprises injecting a fluid into said well at a rate sufficient to open and propagate a fracture in said formation, introducing a fluid containing suspended particles of petroleum coke into the fracture, a major portion of said particles of petroleum coke being between 50 and 200 mesh in size, injecting a fluid containing suspended propping agent particles substantially larger than said particles of petroleum coke into said fracture, and thereafter closing in the well until said fracture has closed on said propping agent particles.

10. A method as defined by claim 9 wherein said fluid containing said suspended particles of petroleum coke is a water-base fluid containing a gelling agent.

11. A method as defined by claim 9 wherein a fluid substantially free of coke and propping agent particles is injected into said fracture between said fluid containing said suspended particles of petroleum coke and said fluid containing said suspended propping agent particles.

* * * * *